(12) United States Patent
Ishidoshiro

(10) Patent No.: US 6,968,181 B2
(45) Date of Patent: Nov. 22, 2005

(54) TECHNIQUE OF PROVIDING INFORMATION TO MOBILE DEVICES

(75) Inventor: Takashi Ishidoshiro, Nagoya (JP)

(73) Assignee: Buffalo Inc., Nagoya (JP)

(*) Notice: Subject to any disclaimer, the term of this patent is extended or adjusted under 35 U.S.C. 154(b) by 363 days.

(21) Appl. No.: 10/323,462

(22) Filed: Dec. 18, 2002

(65) Prior Publication Data
US 2004/0077361 A1    Apr. 22, 2004

Related U.S. Application Data

(60) Provisional application No. 60/419,779, filed on Oct. 17, 2002.

(30) Foreign Application Priority Data
Oct. 31, 2002  (JP) .............................. 2002-317004

(51) Int. Cl.[7] .............................................. H04Q 7/20
(52) U.S. Cl. .............................. 455/414.2; 455/456.3; 455/422.1
(58) Field of Search .......................... 455/456.6, 456.1, 455/456.3, 456.5, 574, 422.1, 414.2, 404.2

(56) References Cited

U.S. PATENT DOCUMENTS

| 5,179,555 | A  | * | 1/1993 | Videlock et al. ............ 370/402 |
| 6,782,253 | B1 | * | 8/2004 | Shteyn et al. ............ 455/414.1 |
| 2004/0054767 | A1 | * | 3/2004 | Karaoguz et al. ........... 709/223 |
| 2004/0203873 | A1 | * | 10/2004 | William .................... 455/456.1 |

FOREIGN PATENT DOCUMENTS

| EP | 0912026 A2 | 4/1999 | |
| EP | 1 176 840 A1 | * | 1/2002 | ............ H04Q 7/22 |
| EP | 1220553 A1 | 7/2002 | |
| JP | 10-304433 | 11/1998 | |
| JP | 2002-44706 | 2/2002 | |
| JP | 2002-259253 | 9/2002 | |
| JP | 2002-288532 | 10/2002 | |
| WO | WO 97/46034 | 12/1997 | |
| WO | WO 00/22860 | 4/2000 | |
| WO | WO00/22860 | 4/2000 | |
| WO | WO00/77756 A1 | 12/2000 | |
| WO | WO01/84867 A1 | 11/2001 | |

OTHER PUBLICATIONS

Japanese Patent Office, Office Action issued in a corresponding Japanese case, Feb. 22, 2005, English translation included.

Chinese Office Action dated May 20, 2005 from a corresponding Chinese Application (English translation enclosed).

* cited by examiner

*Primary Examiner*—Sonny Trinh
(74) *Attorney, Agent, or Firm*—Beyer Weaver & Thomas, LLP

(57) ABSTRACT

The access point of the present invention saves power consumption and attains size reduction of a mobile device that receives information. A radio base station 10a provides a connecting point for connecting a plurality of clients with the Internet 60, and stores announcement information, which is recognizable by a user terminal 20a. The user terminal 20a transmits information to and from an outlet terminal 25 by radio wave. The radio base station 10a detects the position of the user terminal 20a and the position of the outlet terminal 25, based on the receiving status of the radio wave from the user terminal 20a and the outlet terminal 25. The radio base station 10a provides the user terminal 20a with the stored announcement information when the user terminal 20a comes close to the outlet terminal 25 to be within a preset distance from the outlet terminal 25.

7 Claims, 10 Drawing Sheets

Fig.6

| TELEPHONE NUMBER | IP ADDRESS | MAC ADDRESS | BASE STATION ID |
|---|---|---|---|
| 112233 | XYZ.123.1.2 | 12:34:56:78:9A:BC | AP1 |
| 223344 | XYZ.123.1.5 | 23:45:67:89:AB:CD | AP1 |
| 334455 | XYZ.123.2.7 | 45:67:89:AB:CD:EF | AP2 |
| ... | ... | ... | ... |

TECHNIQUE OF PROVIDING INFORMATION TO MOBILE DEVICES

This application claims priority of U.S. Provisional Patent Application No. 60/419,779, filed Oct. 17, 2002 entitled "Technology for Providing Information for Mobile Device," which is hereby incorporated by reference.

BACKGROUND OF THE INVENTION

1. Field of the Invention

The present invention relates to a technique of providing information to mobile clients.

2. Description of the Related Art

Some systems have been proposed to provide preset announcement information (for example, advertisement information, public information, or guide information) when a client, which is a mobile device like a PDA (portable digital assistant), a portable terminal, an electronic organizer, or a wearable computer, approaches a predetermined location (for example, a store, an automatic vending machine, a mobile shop, a facility, a condominium, an apartment house, or a booth in some event). In such a system, the client utilizes a GPS (global positioning system) or another adequate system to acquire positional information representing the own position and transmits the positional information to a base station. The base station then gives the announcement information to the client.

The technique of providing information to mobile devices by utilizing GPS is disclosed in PATENT LAID-OPEN GAZETTE No. 2002-259253.

The mobile device like the PDA, the portable terminal, the electronic organizer, or the wearable computer has a restricted battery capacity. It is accordingly difficult to build a GPS or equivalent system having large power consumption in the mobile device. The mobile device of high portability also has only a limited space in the casing. Incorporation of the GPS or equivalent system in the limited space is against the requirements of size and weight reduction of the mobile device. It has thus been not practical that the mobile device has the detection function of positional information and the position specification function based on the positional information.

SUMMARY OF THE INVENTION

The object of the present invention is thus to solve the problems of the prior art technique discussed above and to save power consumption and attain size reduction of a mobile device that receives announcement information.

In order to attain at least part of the above and the other related objects, the present invention is directed to an access point that provides a connecting point used for connecting a plurality of clients with a wide area network. The access point includes: a wireless communication module that transmits information to and from at least one client among the plurality of clients by radio wave; an announcement information storage module that stores announcement information, which is recognizable by the one client; a status detection module that detects at least a position of the one client, based on a receiving status of the radio wave from the one client; a position specification module that specifies a positional relationship between the position of the one client detected by the status detection module and a position of another client connecting with the connecting point; and an information transmission module that transmits the announcement information stored in the announcement information storage module to the one client, when the position specification module determines that the one client and the another client hold a predetermined positional relationship.

There is a connection method corresponding to this access point. Namely the present invention is also directed to a method of connecting a plurality of clients with a wide area network via an access point. The method includes the steps of: storing announcement information, which is recognizable by the plurality of clients; transmitting information to and from at least one client among the plurality of clients by radio wave; detecting at least a position of the one client, based on a receiving status of the radio wave from the one client; specifying a positional relationship between the detected position of the one client and a position of another client connecting with the access point; and transmitting the stored announcement information to the one client, when it is determined that the one client and the another client hold a predetermined positional relationship.

The access point or the corresponding connection method detects the position of one client, based on the receiving status of radio wave from the one client. When it is determined that the one client and another client hold a predetermined positional relationship, announcement information is transmitted to the one client. The arrangement does not require a mobile device, which is the one client, to individually have the detection function of positional information and the position specification function based on the positional information. This effectively saves power consumption and attains size reduction of the mobile device that receives the announcement information.

There are diverse applications of the access point of the present invention. The predetermined positional relationship may be that the one client comes close to the another client to be within a preset distance from the another client. This arrangement provides the one client with announcement information regarding another client that is within the preset distance from the one client.

In one preferable application of the present invention, the access point has a module that detects an attitude of the one client, in addition to the position of the one client. It is then determined that the one client and the another client hold the predetermined positional relationship, when it is specified that the one client and the another client face each other based on the position and the attitude of the one client and the position of the another client. This arrangement provides the one client with announcement information regarding another client, while the user of the one client faces and pays attention to the another client.

In another preferable application of the present invention, the access point has at least three sector antennas and a wave detection circuit that receives radio wave from each of the at least three sector antennas and outputs a signal level of the received radio wave from each sector antenna. The direction of the one client is detected, based on the signal levels of the radio waves of the respective sector antennas output from the wave detection circuit with regard to the one client. The distance to the one client is detected, based on a response delay time between transmission of a signal to the one client and reception of a reply signal from the one client. The position of the one client is then specified, based on the detected direction of and the detected distance to the one client. This arrangement enables the position of the client to be specified with only one access point.

The access point of the present invention may further include a management module that updates the announcement information. When the access point has a restricted storage capacity for the announcement information, this arrangement enables the updated announcement information to be transmitted to the access point and thereby to each specified client according to a diversity of conditions, for example, elapse of a preset time or connection of a new client.

In one preferable embodiment of the present invention, the access point further has: a local area network operational module that operates a local area network, to which clients are connected; and a router module that interconnects the local area network with the wide area network. This arrangement enables each client connecting with the local area network to be readily linked with the wide area network, and provides each client with the announcement information. The local area network may be a wireless local area network that transmits information by radio wave. This arrangement enables announcement information regarding one client connecting with the wireless local area network to be sent to another client connecting with the wireless local area network. The wireless LAN allows construction of a system, for example, a small-sized hot spot like FreeSpot, to connect a large number of clients with the wide area network freely or easily under management of an administrator.

The above and other objects, features, aspects, and advantages of the present invention will become more apparent from the following detailed description of the preferred embodiment with the accompanying drawings.

BRIEF DESCRIPTION OF THE DRAWINGS

FIG. 2 is a block diagram showing the internal structure of a radio base station 10a;

FIG. 3 is a block diagram showing the internal structure of a user terminal 20a;

FIG. 4 is a block diagram showing the internal structure of a management client 30a;

FIG. 6 shows the contents of a terminal management table 75 as an example;

FIG. 7 is a flowchart showing an audio information providing process executed by the radio base station 10a;

FIG. 9 is a flowchart showing a character information providing process executed by the radio base station 10a; and FIG. 10 shows an example of advertisement data displayed on a display unit 250 of the user terminal 20a.

DESCRIPTION OF THE PREFERRED EMBODIMENT

The following describes a wireless IP telephony system that provides information to a radio IP telephone terminal as one of access points according to the present invention.

Figure 1:
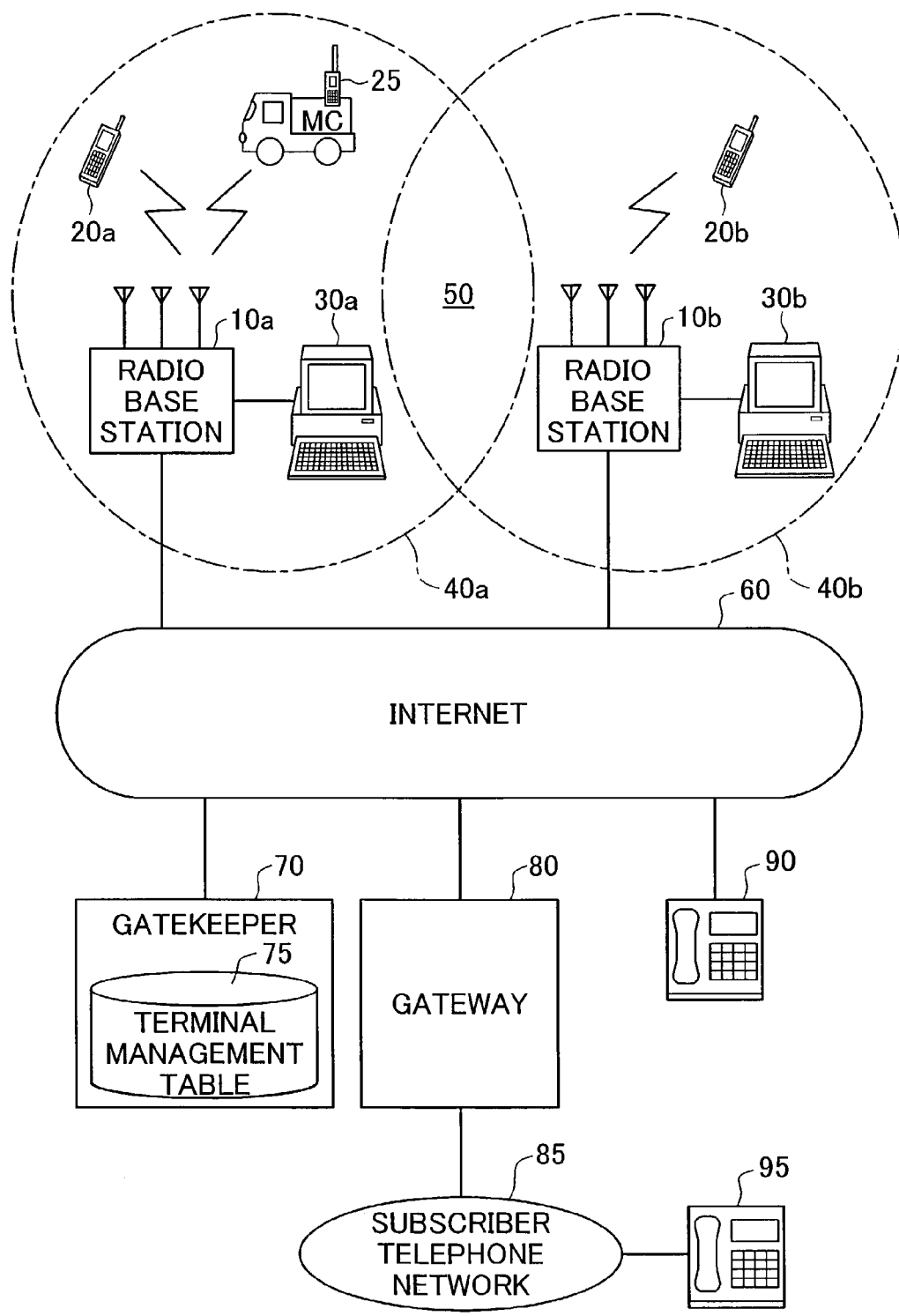
FIG. 1 schematically illustrates the general construction of a wireless IP telephony system in one embodiment of the present invention.

FIG. 1 schematically illustrates the general construction of a wireless IP telephony system in one embodiment of the present invention. In the wireless IP telephony system, radio base stations 10a and 10b function as access points that provide a plurality of clients with access points and are respectively connected to the Internet 60 as a wide area network. User terminals 20a and 20b and an outlet terminal 25 are wireless clients connected to the radio base stations 10a and 10b via wireless local area networks (hereafter referred to as wireless LANs). The user terminals 20a and 20b and the outlet terminal 25 are IP telephone terminals that receive and transmit packets of audio information to attain voice communication and are capable of data transmission in the form of, for example, Internet mails. The outlet terminal 25 is located in a mobile shop (MC) and moves with the mobile shop (MC).

The radio base stations 10a and 10b connect with wireless clients in respective radio zones 40a and 40b, in which radio waves are transmittable. The radio zones 40a and 40b have a mutual overlap area called a band switchover area 50, which functions to switch over the radio channel (band switchover) between the radio base stations 10a and 10b. This band switchover technique allows mobile communication of the wireless clients between the radio zones 40a and 40b. Management clients 30a and 30b are connected respectively with the radio base stations 10a and 10b via local area networks (hereafter referred to as LANs). In addition to the radio base stations 10a and 10b, a gatekeeper 70, a gateway 80, and an IP telephone set 90 are also connected to the Internet 60. The gatekeeper 70 is used to register IP telephony terminals, to manage addresses of connection targets, and to give permission for band license applications. The gateway 80 is connected to a subscriber telephone network 85, with which subscriber telephone sets 95 are linked, and establishes communication between the subscriber telephone and the IP telephone through conversion of their protocols.

Figure 2:
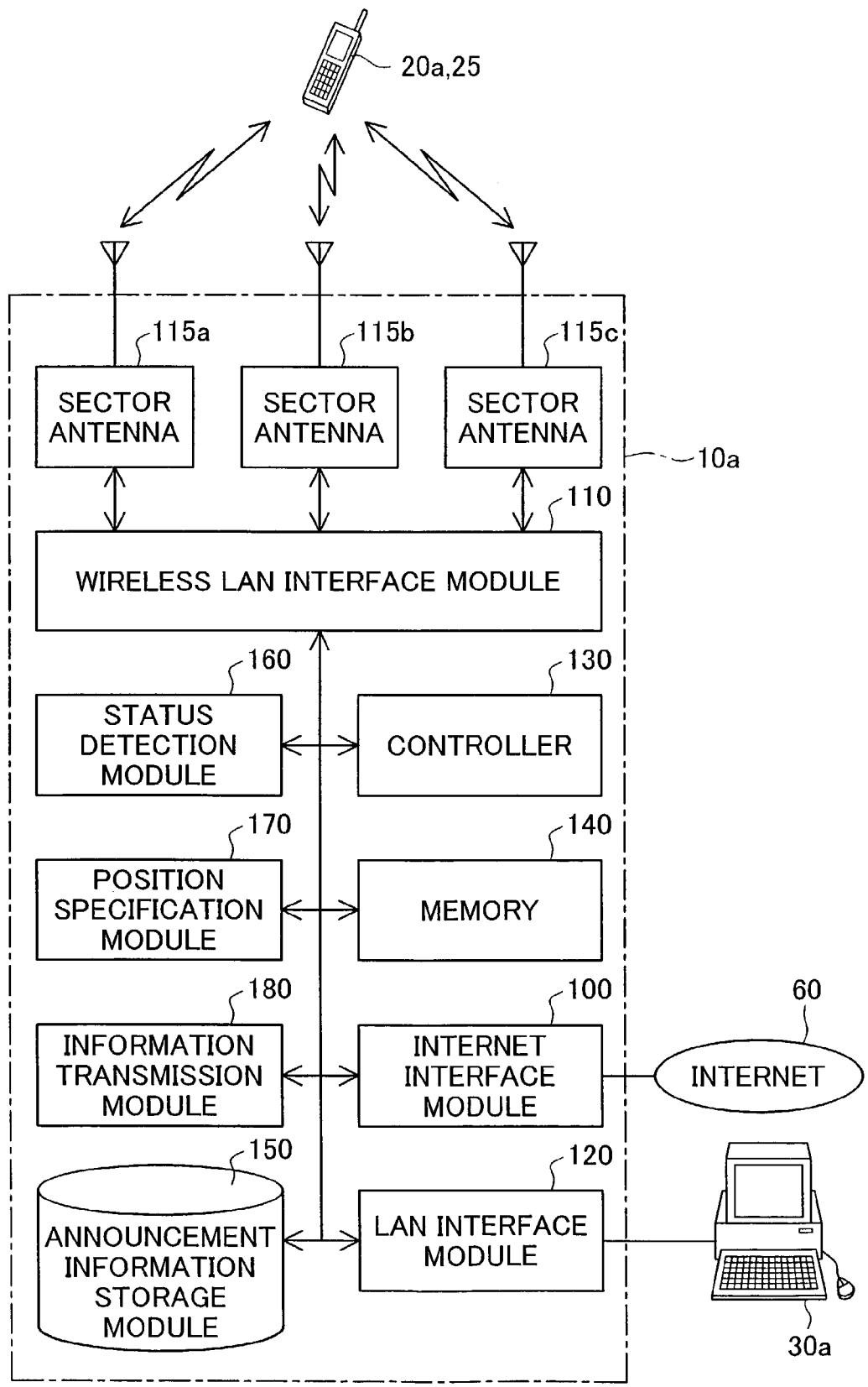

The internal structure of the radio base stations 10a and 10b is discussed below. FIG. 2 is a block diagram showing the internal structure of the radio base station 10a. The radio base station 10a has an Internet interface module 100, a wireless LAN interface module 110, and a LAN interface module 120, which respectively interface inputs and outputs from and to the Internet 60, a wireless LAN, and a LAN. Three sector antennas 115a, 115b, and 115c are connected to the wireless LAN interface module 110 to transmit information to and from the wireless clients by radio wave. The radio base station 10a also has a controller 130 that processes various pieces of information transmitted from the respective constituents and control these constituents, a memory 140 that temporarily stores information used for various series of processing executed by the controller 130, and an announcement information storage module 150 that stores announcement information, which is recognizable by the wireless clients. The radio base station 10a further includes a status detection module 160 that detects the position of each wireless client, a position specification module 170 that specifies a positional relationship between the clients, and an information transmission module 80 that transmits the announcement information to the wireless clients. The controller 130 has the router function to interconnect the Internet 60 with a wireless LAN or a cabled LAN. The radio base station 10a is capable of handling 16 global IP addresses at most. Among the 16 IP addresses, one IP address is used by the radio base station 10a itself, while the residual 15 IP addresses are allocated to user terminals. Namely the radio base station 10a is connectable with up to 15 user terminals.

The status detection module 160 of the radio base station 10a has a direction detection function that detects the direction of each wireless client located in the radio zone 40a, a distance detection function that detects the distance from the wireless client, and a position detection function that detects the position of the wireless client. The sector antennas 115a, 115b, and 115c having directional characteristics in different directions respectively receive radio wave signals from each wireless client located in the radio zone 40a. The status detection module 160 first activates its direction detection function to compare differences between levels of the received radio wave signals with emission characteristics of the sector antennas 115a, 115b, and 115c stored in advance in an internal memory circuit (not shown), so as to detect the direction of the wireless client relative to the radio base station 10a. The status detection module 160 then activates its distance detection function to detect the distance of the wireless client from the radio base station 10a according to a delay time of a replay signal from the wireless client in response to a signal transmitted from the radio base station 10a. The status detection module 160 subsequently activates its position detection function to detect the position of the wireless client, based on the detected direction of and the detected distance to the wireless client. An increase in number of sector antennas enhances the accuracy of the detected position. The technique of detecting the position of the wireless client is disclosed in PATENT LAID-OPEN GAZETTE No. 2002-44706.

In the example of FIG. 1 where the user terminal 20a and the outlet terminal 25 are located in the radio zone 40a, the position specification module 170 of the radio base station 10a compares the position of the user terminal 20a detected by the status detection module 160 with the position of the outlet terminal 25 detected by the status detection module 160. Based on a result of the comparison between the detected positions, the position specification module 170 determines whether or not the user terminal 20a comes close to the outlet terminal 25 to be within a preset distance (for example, within 30 meters) from the outlet terminal 25.

The information transmission module 180 transmits the announcement information with regard to the outlet terminal 25 stored in advance in the announcement information storage module 150 to the user terminal 20a, based on the determination by the position specification module 170 that the user terminal 20a comes close to the outlet terminal 25 to be within the preset distance from the outlet terminal 25. The radio base station 10b has an identical internal structure with that of the radio base station 10a.

Figure 3:
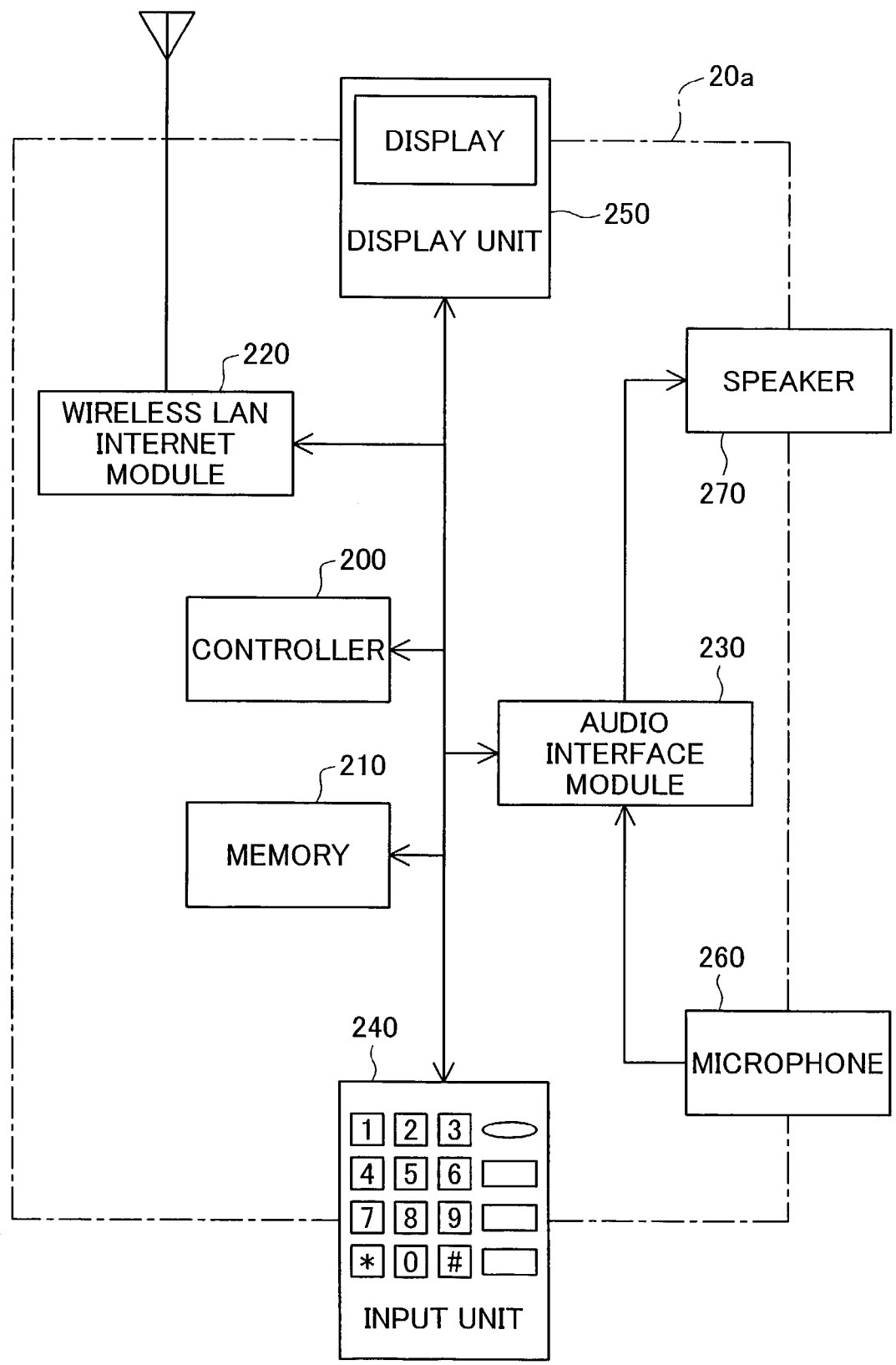

The internal structure of the user terminals 20a and 20b and the outlet terminal 25 is described here. FIG. 3 is a block diagram showing the internal structure of the user terminal 20a. The user terminal 20a has a controller 200, a memory 210, a wireless LAN interface module 220, an audio interface module 230, an input unit 240, and a display unit 250. The controller 200 processes various pieces of information transmitted from the respective constituents and control these constituents. The memory 210 temporarily stores information used for various series of processing executed by the controller 200. The wireless LAN interface module 220 interfaces inputs and outputs from and to a wireless LAN. The audio interface module 230 is connected with a microphone 260 for audio inputs and a speaker 270 for audio outputs and interfaces the audio inputs and outputs. The input unit 240 detects a user's calling operation. The display unit 250 causes diverse pieces of information, such as character and picture images, to be displayed on a display. The user terminal 20b and the outlet terminal 25 have identical internal structures with that of the user terminal 20a. The outlet terminal 25 is not required to have the identical internal structure with that of the user terminal 20a. The only requirement is that the outlet terminal 25 has the function that allows the radio base station 10a to detect the position of the outlet terminal 25.

Figure 4:
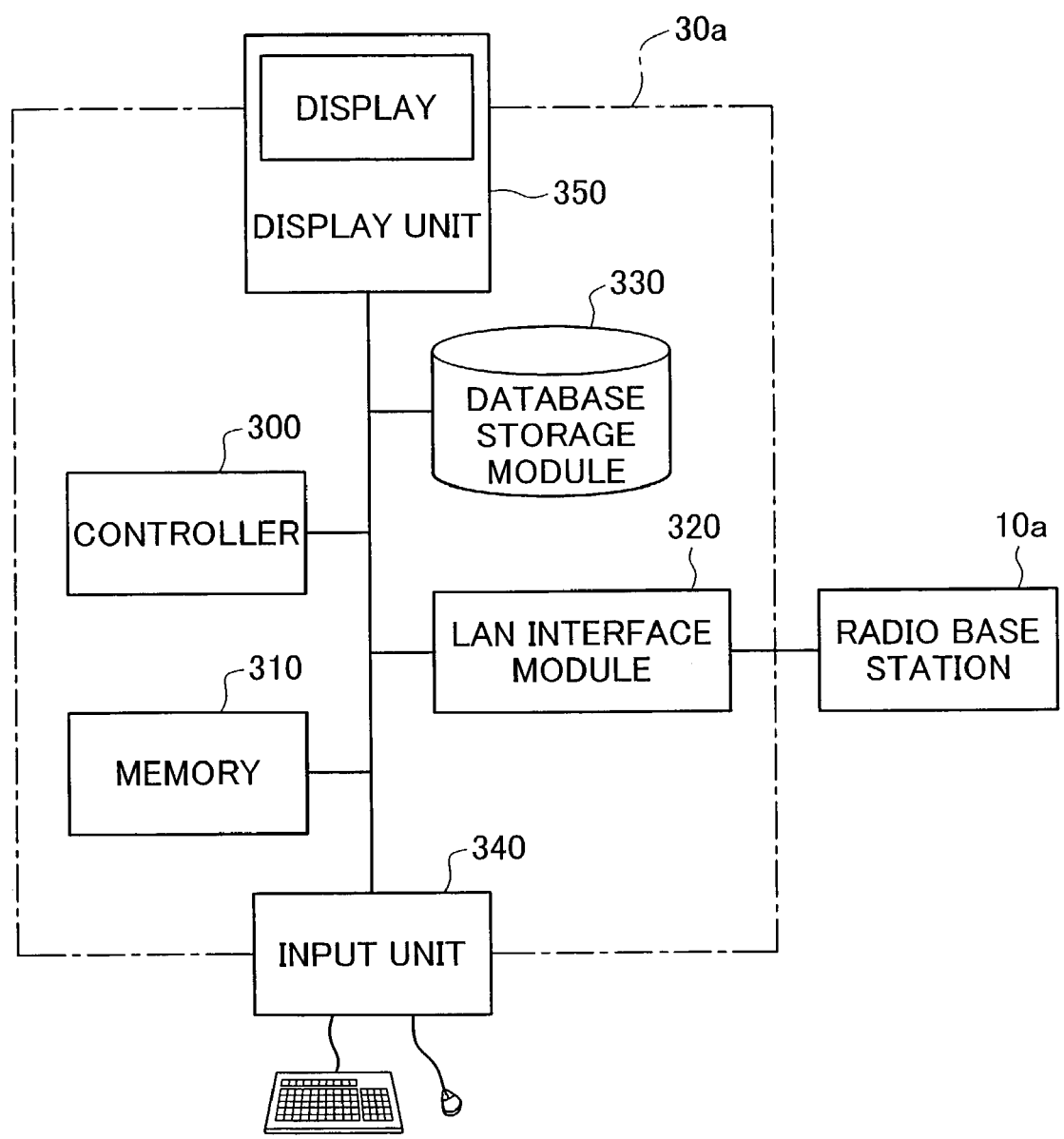

The internal structure of the management clients 30a and 30b is described here. FIG. 4 is a block diagram showing the internal structure of the management client 30a. The management client 30a has a controller 300, a memory 310, a LAN interface module 320, a database storage module 330, an input unit 340, such as a keyboard and a mouse, and a display unit 350, such as a display. The controller 300 processes various pieces of information transmitted from the respective constituents and control these constituents. The memory 310 temporarily stores information used for various series of processing executed by the controller 300. The LAN interface module 320 transmits information to and from the radio base station 10a via a LAN. The database storage module 330 keeps the announcement information with regard to the outlet terminal 25, which is to be stored in the announcement information storage module 150 of the radio base station 10a, in the form of a database. The management client 30b has an identical internal structure with that of the management client 30a.

Figure 5:
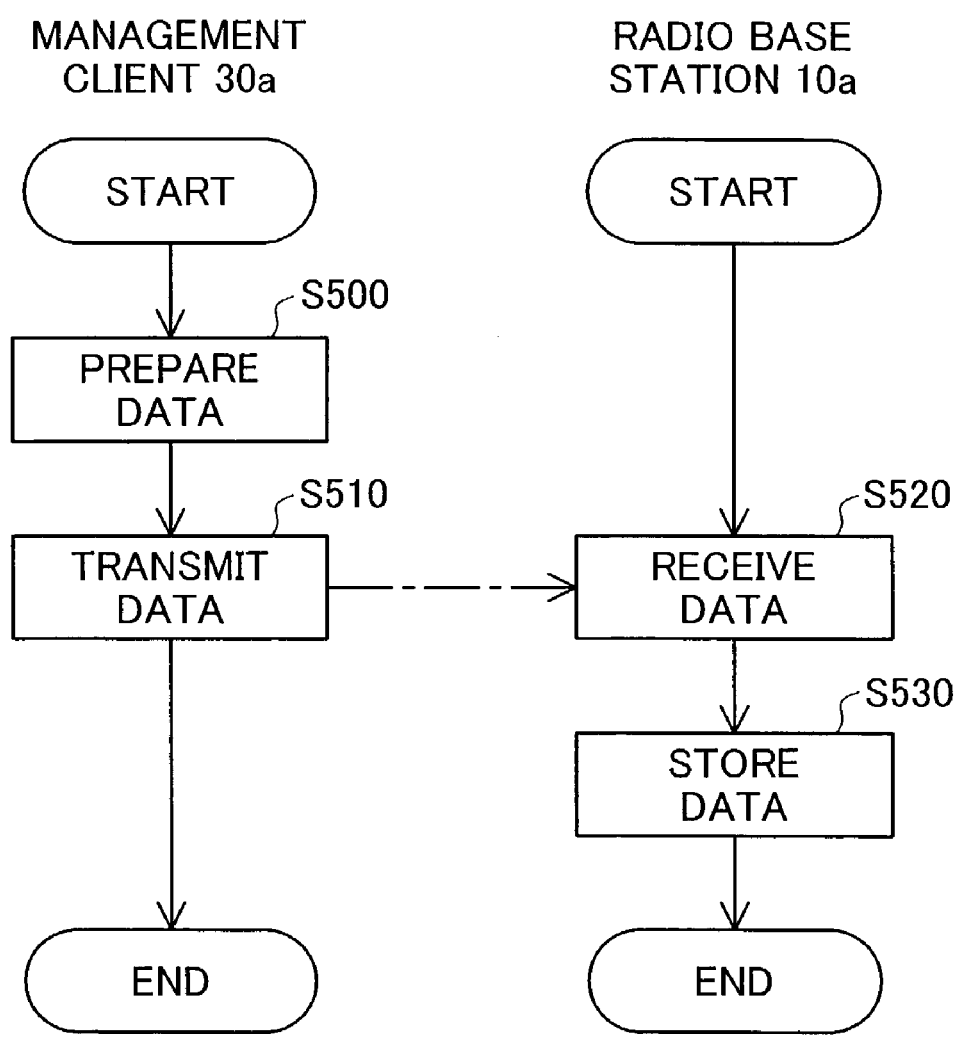
FIG. 5 is a flowchart showing a data storage process.

The management client 30a stores advertisement data, which is the announcement information with regard to the outlet terminal 25, into the announcement information storage module 150 of the radio base station 10a according to a data storage process discussed below. The advertisement data is audio advertisement information regarding a mobile shop with the outlet terminal 25. The advertisement data is obtained by converting analog audio data into a form of digital data to allow transmission between digital devices, and is reproducible by the IP telephony terminals. FIG. 5 is a flowchart showing the data storage process. The right side shows a series of processing executed by the radio base station 10a, and the left side shows a series of processing executed by the management client 30a. The management client 30a first creates advertisement data or reads advertisement data from a recording medium or a network, and sets the advertisement data in the memory 310 (step S500). The management client 30a then transmits the prepared advertisement data to the radio base station 10a via a LAN (step S510).

The radio base station 10a receives the transmitted advertisement data (step S520) and stores the received advertisement data with the date of storage into the announcement information storage module 150 (step S530). The management client 30b carries out the same series of data storage process to the radio base station 10b.

The following describes the registration of the user terminal 20a into the gatekeeper 70 in the radio IP telephony system. The user terminal 20a entering the radio zone 40a transmits a linkage request to the radio base station 10a. In response to input of the linkage request, the radio base station 10a transmits a notice of linkage acceptance to the user terminal 20a and allocates an IP address to the user terminal 20a. The user terminal 20a then notifies the radio base station 10a of a terminal ID. The terminal ID is an identifier for identifying each terminal and includes, for example, an IP address, a MAC (Media Access Control) address, and a telephone number originally allocated thereto. The radio base station 10a receives the terminal ID and sends the terminal ID and a base station ID, which is an identifier for identifying the base station, to the gatekeeper 70.

The gatekeeper 70 receives the terminal ID and the base station ID and registers the input terminal ID and base station ID into a terminal management table 75 built in the gatekeeper 70. FIG. 6 shows the contents of the terminal management table 75 as an example. The terminal management table 75 has the registration of a mapping of the telephone number, the IP address, and the MAC address as the terminal ID to the base station ID. The registration is not stationary. For example, when the user terminal 20a is moved from the radio zone 40a of the radio base station 10a to the radio zone 40b of the radio base station 10b, the IP address and the base station ID registered in the terminal management table 75 are updated. The registration is carried out at preset timings. The user terminal 20b and the outlet terminal 25 are also subjected to this registration process when entering the radio zone.

In the radio IP telephony system, voice communication is established in the following manner, in response to a call from the user terminal 20a to the user terminal 20b. When the user inputs the telephone number of the user terminal 20b as a connection target on the input unit 240 of the user terminal 20a, the user terminal 20a transmits the input telephone number to the gatekeeper 70 via the radio base station 10a. The gatekeeper 70 refers to the terminal management table 75 and transmits the IP address of the user terminal 20b, which is mapped to the transmitted telephone number, to the user terminal 20a via the radio base station 10a. The user terminal 20a receives the IP address and establishes connection with the user terminal 20b via the radio base station 10a based on the received IP address.

After establishment of connection between the user terminal 20a and the user terminal 20b, the user terminal 20a transmits a calling signal to the user terminal 20b. The user terminal 20b receives the calling signal and transmits a called signal to the user terminal 20a. In response to a receiver lifting operation of the user terminal 20b, the user terminal 20b transmits a reply signal to the user terminal 20a. When the user terminal 20a receives the reply signal, connection between the user terminal 20a and the user terminal 20b is established for voice communication. Voice communication or data communication continues until a hang up of either of the user terminals 20a and 20b. The voice communication between the user terminal 20a and the user terminal 20b is just one example. In the radio IP telephony system, voice communication is allowable between any combination of the user terminals 20a and 20b, the outlet terminal 25, the IP telephone set 90, and the subscriber telephone set 95.

Figure 7:
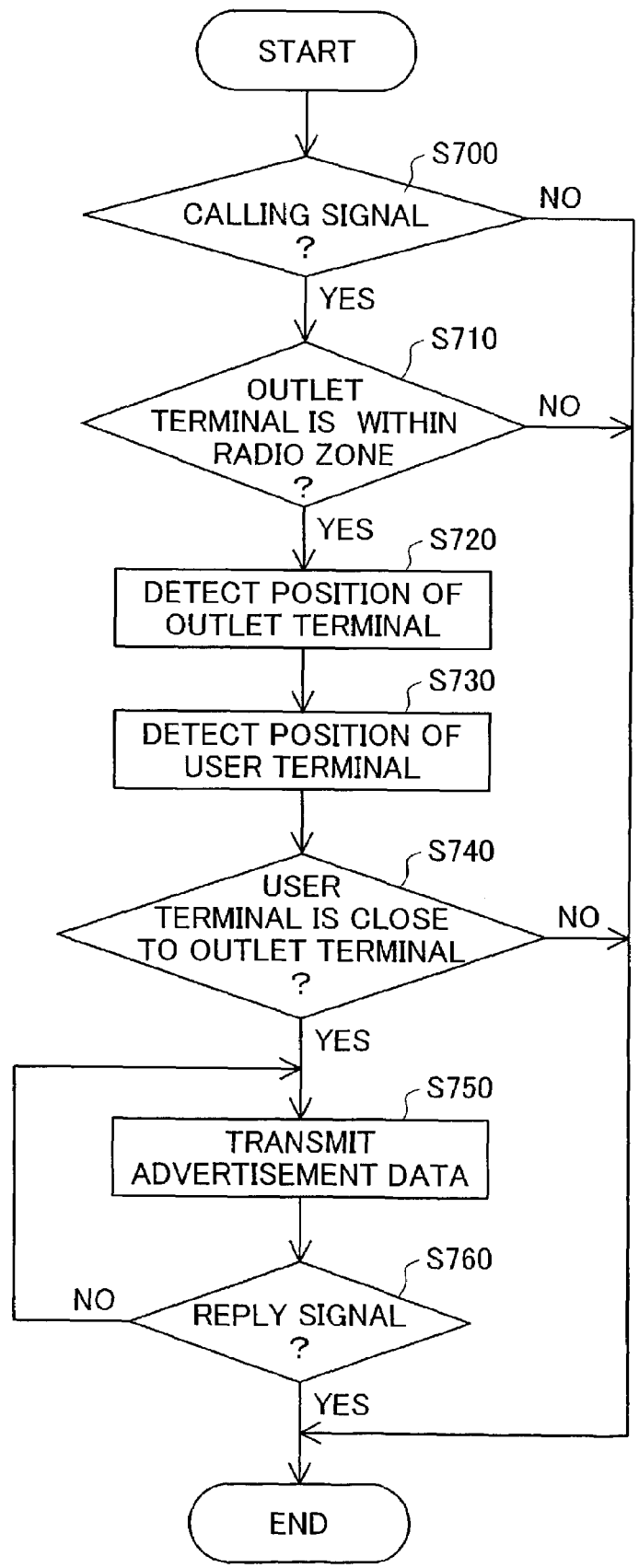
Figure 8:
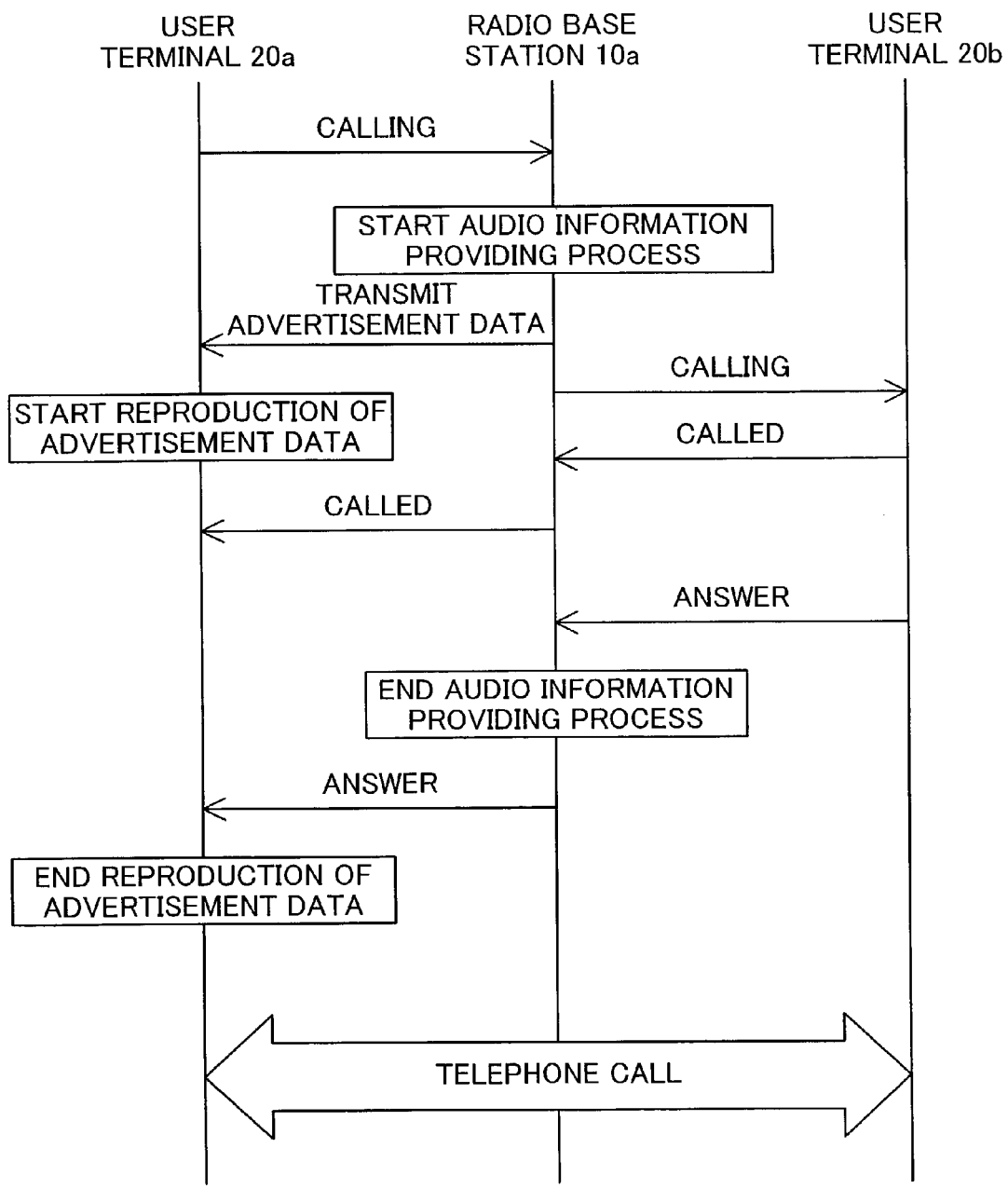
FIG. 8 shows a sequence of communication in the process of transmission of advertisement data.

In the process of a call from the user terminal 20a to the user terminal 20b, the radio base station 10a transmits audio advertisement data to the user terminal 20a according to an audio information providing process discussed below. FIG. 7 is a flowchart showing the audio information providing process executed by the radio base station 10a. FIG. 8 shows a sequence of communication in the process of transmission of advertisement data.

After establishment of the connection between the user terminal 20a and the user terminal 20b, the radio base station 10a determines whether or not there is a calling signal from the user terminal 20a to the user terminal 20b (step S700). In the absence of a calling signal, the program immediately exits from this audio information providing routine. In the presence of a calling signal, on the other hand, it is determined whether or not the outlet terminal 25 is within the radio zone 40a (step S710). When the outlet terminal 25 is not within the radio zone 40a, there is no need of providing the advertisement data. The program thus exits from the audio information providing routine. When the outlet terminal 25 is within the radio zone 40a, on the other hand, the status detection module 160 is activated to detect the position of the outlet terminal 25 based on the reception status of radio wave from the outlet terminal 25 (step S720) and to detect the position of the user terminal 20a based on the reception status of radio wave from the user terminal 20a (step S730). The position specification module 170 is then activated to specify the positional relationship between the detected position of the outlet terminal 25 and the detected position of the user terminal 20a (step S740). When it is determined that the user terminal 20a comes close to the outlet terminal 25 to be within a preset distance (for example, within 30 meters) from the outlet terminal 25, the information transmission module 180 is activated to transmit the advertisement data with regard to the outlet terminal 25, which is stored in advance in the announcement information storage module 150, to the user terminal 20a (step S750). When it is determined that the user terminal 20a is not close to the outlet terminal 25, the program exits from the audio information providing routine without any further processing. Transmission of the advertisement data continues (step S750) until there is a reply signal from the user terminal 20b to the user terminal 20a (step S760). The program concludes this audio information transmission process in response to detection of the reply signal.

According to the audio information providing process discussed above, the user terminal 20a continuously receives the advertisement data from the radio base station 10a for a time period between transmission of the calling signal and reception of the reply signal, and reproduces the received advertisement data by means of the speaker 270.

In the audio information providing process of this embodiment, the start of the transmission of advertisement data is determined by the presence or the absence of a calling signal (step S700). The start of the transmission of advertisement data may alternatively be determined by the presence or the absence of a called signal. The above description regards the case of making a phone call from the user terminal 20a to the user terminal 20b. In the case of making a phone call from the user terminal 20b to the user terminal 20a, the radio base station 10b carries out the above series of audio information providing process to the user terminal 20b. In the above description, the communication target of the user terminal 20a is the user terminal 20b. But the communication target may be any terminal communicable with the user terminal 20a, for example, the IP telephone set 90 or the subscriber telephone set 95. The transmission timing of the advertisement data is not restricted to at the start of communication of the audio information, but may be at the end of communication of the audio information or in the course of communication of the audio information. The transmission timing of the advertisement data is not restricted to the process of voice communication. In one modified application, when the user terminal 20a comes close to the outlet terminal 25 to be within a preset distance from the outlet terminal 25, the radio base station 10a calls the user terminal 20a and transmits the advertisement data to the user terminal 20a.

In the embodiment discussed above, the radio base station 10a detects the positions of the user terminal 20a and the outlet terminal 25 based on the reception statuses of radio wave from the user terminal 20a and the outlet terminal 25. When it is determined that the user terminal 20a closes to the outlet terminal 25 to be within the preset distance from the outlet terminal 25, the advertisement data with regard to the outlet terminal 25 is transmitted to the user terminal 20a. The mobile device as the client is thus not required to have the function of detecting the positional information and the function of specifying the positional relationship. This arrangement thus desirably saves power consumption and attains size reduction of the mobile device that receives the announcement information.

The above embodiment and its applications are to be considered in all aspects as illustrative and not restrictive.

There may be many modifications, changes, and alterations without departing from the scope or spirit of the main characteristics of the present invention. In the above embodiment, the announcement information is the audio advertisement information to be transmitted to the user terminal 20a in the process of voice communication. The announcement information may be character advertisement information, which is transmitted to the user terminal 20a independently of the voice communication.

Figure 9:
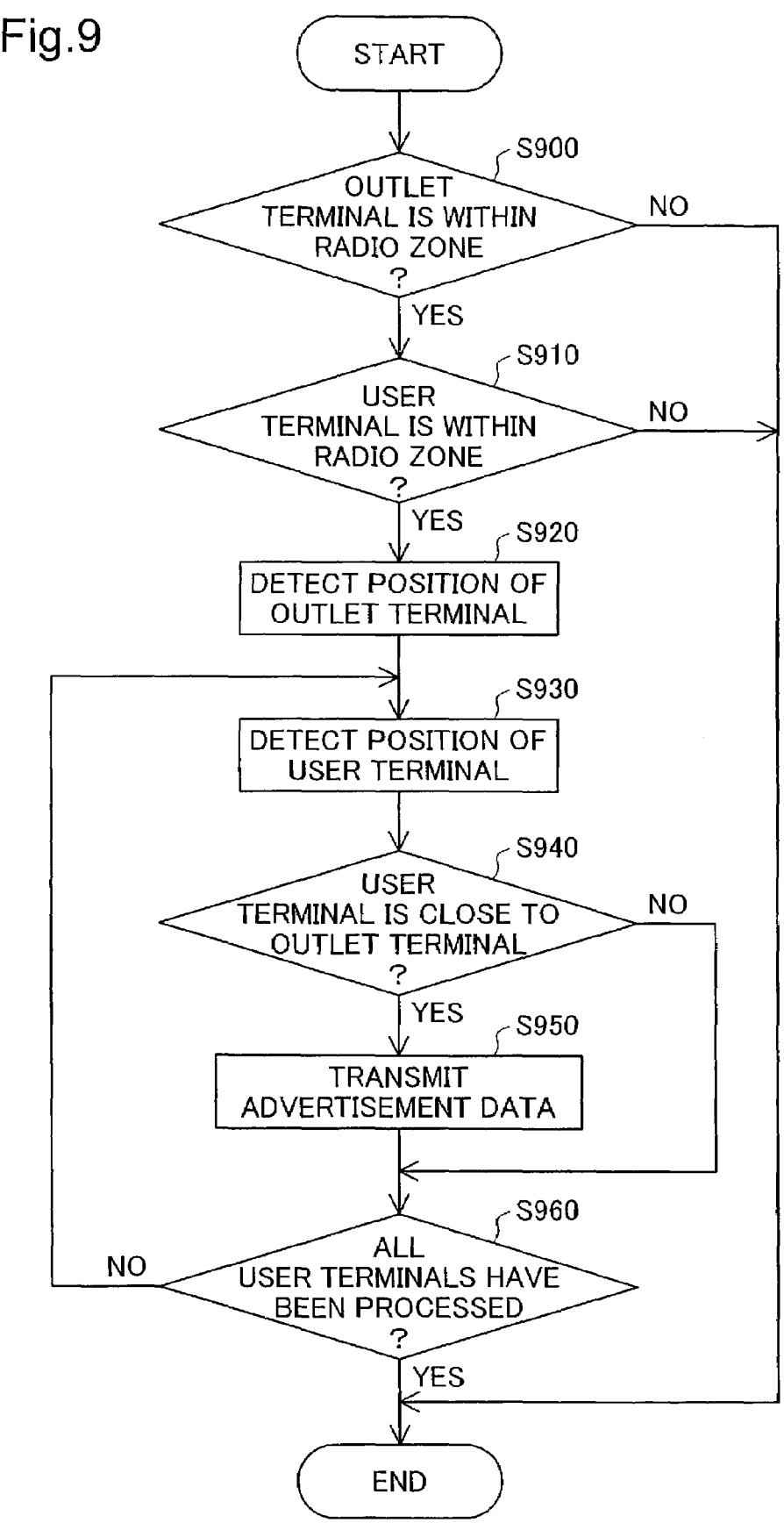

The radio base station 10a transmits character advertisement information to the user terminal 20a according to a character information providing process discussed below. FIG. 9 is a flowchart showing the character information providing process executed by the radio base station 10a. In this modified procedure, the advertisement data, which is the announcement information stored in the announcement information storage module 150 of the radio base station 10a in the data storage process discussed above, is character advertisement information with regard to a mobile shop with the outlet terminal 25, and is displayable on the display unit 250 of the user terminal 20a.

The radio base station 10a first determines whether or not the outlet terminal 25 is within the radio zone 40a (step S900). When the outlet terminal 25 is not within the radio zone 40a, there is no need of providing the advertisement data. The program thus immediately exists from the character information providing routine. When the outlet terminal 25 is within the radio zone 40a, on the other hand, it is then determined whether or not at least one user terminal is within the radio zone 40a (step S910). When no user terminal is within the radio zone 40a, there is no need of providing the advertisement data. The program thus immediately exits from the character information providing routine. For example, it is assumed here that the user terminal 20a is located in the radio zone 40a. In this case, the status detection module 160 is activated to detect the position of the outlet terminal 25 based on the reception status of radio wave from the outlet terminal 25 (step S920) and to detect the position of the user terminal 20a based on the reception status of radio wave from the user terminal 20a (step S930). The position specification module 170 is subsequently activated to specify the positional relationship between the detected position of the outlet terminal 25 and the detected position of the user terminal 20a (step S940).

When it is determined that the user terminal 20a comes close to the outlet terminal 25 to be within a preset distance (for example, within 30 meters) from the outlet terminal 25, the information transmission module 180 is activated to transmit the advertisement data with regard to the outlet terminal 25, which is stored in advance in the announcement information storage module 150, to the user terminal 20a (step S950). At this moment, the terminal ID of the user terminal 20a and the date of transmission are stored in the announcement information storage module 150. In the case where the date of transmission stored at the time of the previous transmission of the advertisement data at step S950 is after the date of storage of the advertisement data stored in the data storage process, the advertisement data is not transmitted to the user terminal 20a. This prevents transmission of the same advertisement data from being repeatedly transmitted to the user terminal 20a. Transmission of the advertisement data is not carried out when it is determined that the user terminal 20a is not close to the outlet terminal 25. The processing of steps S930 to S950 is iteratively executed until the specification of the positional relationship has been concluded with regard to all the user terminals located in the radio zone 40a (step S960). When the specification of the positional relationship has been completed for all the user terminals, the program exits from the character information providing routine. The radio base station 10a repeats this character information providing routine at preset timings.

Figure 10:
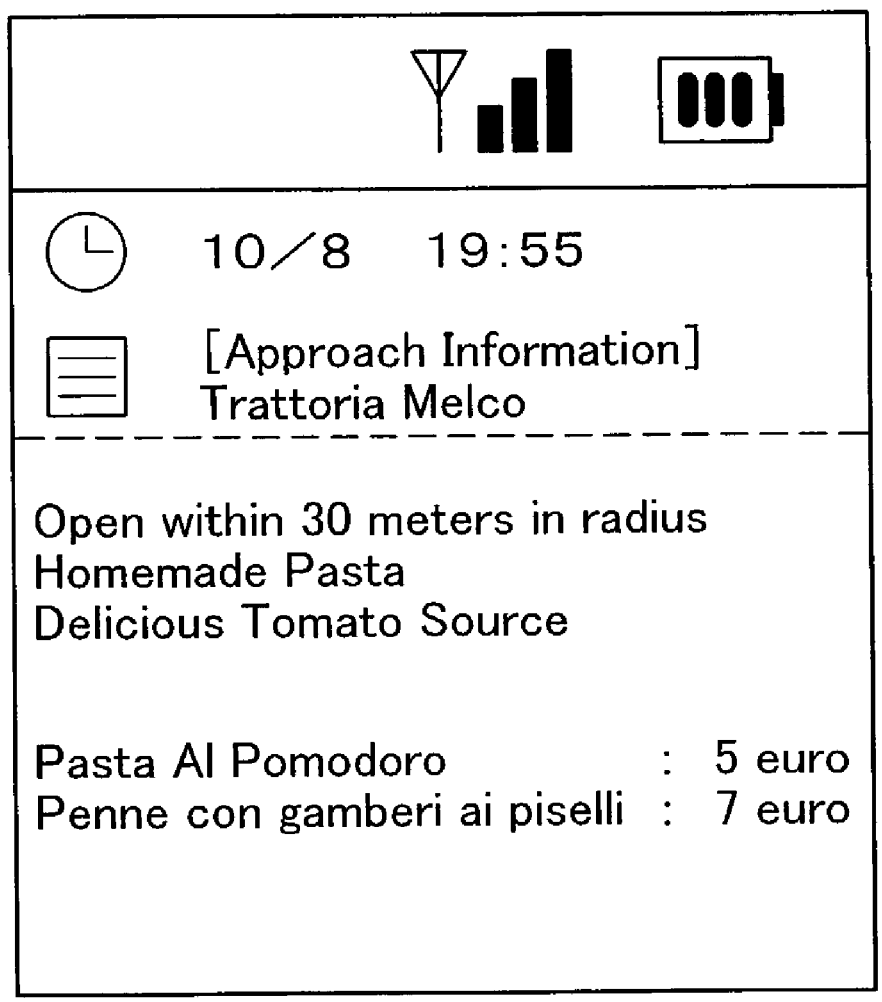

According to the character information providing process discussed above, the user terminal 20a receives the transmitted advertisement data and causes the received advertisement data to be displayed on the display of the display unit 250. FIG. 10 shows an example of the advertisement data displayed on the display unit 250 of the user terminal 20a.

This modified procedure enables the radio base station 10a to provide all the user terminals approaching to the outlet terminal 25 with the announcement information, independently of the voice communication. In this modified arrangement, the user terminal 20a may not have the IP telephony function but may be any terminal having the function of displaying character announcement information.

The radio base station 10a may acquire the individual information of the user who uses the user terminal 20a in the audio information providing process or in the character information providing process described above, and makes the acquired individual information reflected on the advertisement data. The individual information may be stored in advance in the memory 140 of the radio base station 10a or obtained from an individual information management server via a network. This arrangement estimates the user's taste based on the acquired individual information of the user, and transmits the advertisement data matching the estimated user's taste or rewrites part of the existing advertisement data according to the estimated user's taste. In another modified procedure, the radio base station 10a acquires the individual information of the user who uses the user terminal 20a in the audio information providing process or in the character information providing process discussed above, and determines the legitimacy of the transmission of certain advertisement data. For example, the advertisement data relates to the sales of tobaccos or alcohols. In the case where the user is under 20, the advertisement data is not transmitted to the user who satisfies the condition of the predetermined positional relationship (step S740 in FIG. 7 or step S950 in FIG. 9).

In another modified structure, the user terminal 20a may have an antenna having directional characteristics, and the radio base station 10a may have a module of detecting the attitude of the user terminal 20a. In this structure, the positional relationship to be specified based on the position and the attitude of the user terminal 20a and the position of the outlet terminal 25 is that the user terminal 20a faces the outlet terminal 25. This arrangement enables the advertisement data to be provided to the user who faces an object with the outlet terminal. The position specification module 170 may estimate a movement of each wireless client according to the time series of positional data of the wireless client and specify the positional relationship based on the estimation. The radio base station 10a may handle the advertisement information with regard to a plurality of outlet terminals 25. The connection of the radio base station 10a is not restricted to the Internet 60 but maybe any other wide area network.

In the above embodiment, the outlet terminal 25 is located in the mobile shop. The outlet terminal 25 may, however, be located, in a stationary shop. The outlet terminal 25 is not restricted to the client of the wireless LAN but may be a client connected by a cabled LAN or by another communication means. In the case of a stationary shop, the positional data of the outlet terminal 25 may be registered in advance in an internal memory circuit (not shown).

The user terminals 20a and 20b and the outlet terminal 25 are all the radio IP telephone sets in the above embodiment, but they may be any of wearable devices, Internet radio receivers, PDAs (personal digital assistants), and portable terminals like laptop computers. The announcement information may be given in the form of an E mail, audio information, link information to Web data, or any other suitable application. The announcement information is not restricted to the advertisement data of the store, but may be public information in a condominium, an apartment house, or another small-sized community, or guide information of booths in some event.

The scope and spirit of the present invention are indicated by the appended claims, rather than by the foregoing description

What is claimed is:

1. An access point that provides a connecting point used for connecting a plurality of clients with a wide area network, said access point comprising:
    a wireless communication module that transmits information to and from at least one client among said plurality of clients by radio wave;
    an announcement information storage module that stores announcement information, which is recognizable by said one client;
    a status detection module that detects at least a position of said one client, based on a receiving status of the radio wave from said one client, said status detection module further including sub-module that detects an attitude of said one client, in addition to the position of said one client;
    a position specification module that specifies a positional relationship between the position of said one client detected by said status detection module and a position of another client connecting with said access point, said position specification module determining that said one client and said another client hold a predetermined positional relationship, when it is specified that said one client and said another client face each other based on the position and the attitude of said one client and the position of said another client; and
    an information transmission module that transmits the announcement information stored in said announcement information storage module to said one client, when said position specification module determines that said one client and said another client hold the predetermined positional relationship.

2. An access point in accordance with claim 1, wherein the predetermined positional relationship is that said one client comes close to said another client to be within a preset distance from said another client.

3. An access point in accordance with claim 1, wherein said wireless communication module comprises at least three sector antennas and a wave detection circuit that receives radio wave from each of the at least three sector antennas and outputs a signal level of the received radio wave from each sector antenna,
    said status detection module comprising:
        a direction detection sub-module that detects a direction of said one client, based on the signal levels of the radio waves of the respective sector antennas output from the wave detection circuit with regard to said one client; and
        a distance detection sub-module that detects a distance to said one client, based on a response delay time between transmission of a signal to said one client and reception of a reply signal from said one client,
        said position specification module specifying the position of said one client, based on the detected direction of and the detected distance to said one client.

4. An access point in accordance with claim 1, said access point further comprising:
    a management module that updates the announcement information stored in said announcement information storage module.

5. An access point in accordance with claim 1, said access point further comprising:
    a local area network operational module that operates a local area network, to which clients are connected; and
    a router module that interconnects the local area network with the wide area network.

6. An access point in accordance with claim 5, wherein the local area network is a wireless local area network that transmits information by radio wave.

7. A method of connecting a plurality of clients with a wide area network via an access point, said method comprising the steps of
    storing announcement information, which is recognizable by said plurality of clients;
    transmitting information to and from at least one client among said plurality of clients by radio wave;
    detecting at least a position and an attitude of said one client, based on a receiving status of the radio wave from said one client;
    specifying a positional relationship between the detected position of said one client and a position of another client connecting with said access point, including determining that said one client and said another client hold a predetermined positional relationship, when it is specified that said one client and said another client face each other based on the position and the attitude of said one client and the position of said another client; and
    transmitting the stored announcement information to said one client, when it is determined that said one client and said another client hold a predetermined positional relationship.

* * * * *

UNITED STATES PATENT AND TRADEMARK OFFICE
CERTIFICATE OF CORRECTION

PATENT NO. : 6,968,181 B2  Page 1 of 1
APPLICATION NO. : 10/323462
DATED : November 22, 2005
INVENTOR(S) : Takashi Ishidoshiro It is certified that error appears in the above-identified patent and that said Letters Patent is hereby corrected as shown below:

In the claims:

In line 2 of claim 2 (column 11, line 51) change "predetennined" to --predetermined--.

Signed and Sealed this

Twenty-fifth Day of July, 2006

JON W. DUDAS
*Director of the United States Patent and Trademark Office*